(12) United States Patent
Schmid et al.

(10) Patent No.: US 8,287,410 B2
(45) Date of Patent: *Oct. 16, 2012

(54) DEVICE FOR PLACING LOOPED BELT UNDER TENSION

(75) Inventors: Hartmut Schmid, North Vancouver (CA); Paul O'Donnell, Los Gatos, CA (US)

(73) Assignee: York Industries, Inc., Garden City Park, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/909,647

(22) Filed: Oct. 21, 2010

(65) Prior Publication Data

US 2011/0034281 A1 Feb. 10, 2011

Related U.S. Application Data

(63) Continuation of application No. 11/093,220, filed on Mar. 28, 2005, now Pat. No. 7,824,286.

(51) Int. Cl.
*F16H 7/12* (2006.01)

(52) U.S. Cl. ........... 474/135; 474/138; 411/546; 470/49

(58) Field of Classification Search ............... 474/113, 474/117, 133–138; 411/132, 136, 140, 147–150, 411/154, 155, 531, 546; 292/43, 55, 90, 292/115, 176, 155; 470/3, 49, 162, 163; 16/2.5

See application file for complete search history.

(56) References Cited

U.S. PATENT DOCUMENTS

| | | | | |
|---|---|---|---|---|
| 986,539 A | * | 3/1911 | Battin | 411/147 |
| 2,261,316 A | * | 11/1941 | Weller | 474/111 |
| 2,709,470 A | * | 5/1955 | Knohl | 411/134 |
| 3,071,980 A | * | 1/1963 | Brewer | 474/133 |
| 3,072,423 A | * | 1/1963 | Charlton | 403/83 |
| 3,171,518 A | * | 3/1965 | Bergmann | 403/296 |
| 3,353,420 A | * | 11/1967 | Rivers | 474/133 |
| 3,355,200 A | * | 11/1967 | Storch | 403/145 |
| 3,811,333 A | * | 5/1974 | Castarede | 474/135 |
| 3,835,615 A | * | 9/1974 | King, Jr. | 403/408.1 |
| 4,033,196 A | * | 7/1977 | Maeda | 474/135 |
| 4,500,303 A | * | 2/1985 | Sermersheim et al. | 474/112 |
| 4,713,045 A | * | 12/1987 | Kodama et al. | 474/135 |
| 4,767,383 A | * | 8/1988 | St. John | 474/133 |
| 4,957,471 A | * | 9/1990 | St. John | 474/133 |
| 5,015,217 A | * | 5/1991 | Henderson | 474/135 |
| 5,064,405 A | * | 11/1991 | St. John | 474/133 |
| 5,147,151 A | * | 9/1992 | Hipkins, Jr. | 405/259.1 |
| 5,333,913 A | * | 8/1994 | Stallard, III | 285/48 |
| 5,584,628 A | * | 12/1996 | Bernoni | 411/84 |
| 5,807,052 A | * | 9/1998 | Van Boven et al. | 411/353 |

(Continued)

*Primary Examiner* — Bradley King
*Assistant Examiner* — Thomas Irvin
(74) *Attorney, Agent, or Firm* — Nixon & Vanderhye, P.C.

(57) ABSTRACT

A tensioning device has a tension arm mounted on a base. A pulley is mounted on the tension arm for engaging a looped belt. By changing mounting bushings, one can select either a static mode wherein the tension arm is held stationary relative to the base, or a dynamic mode wherein, in response to a changing force applied between the pulley and the belt (due to vibrations or load changes, for example), the tension arm moves relative to the base such in a manner as to maintain the force substantially constant. Several such devices can be employed in a system for controlling the tension of a looped belt, one or more of the devices being in the static mode and one or more being in the dynamic mode. Several such systems can be employed in a complex machine such as a photocopier or medical apparatus for controlling the tension in a number of different belts.

9 Claims, 10 Drawing Sheets

U.S. PATENT DOCUMENTS

| | | | |
|---|---|---|---|
| 5,820,503 A * | 10/1998 | Bruchner et al. | 474/112 |
| 6,059,503 A * | 5/2000 | Johnson | 411/353 |
| 6,061,870 A * | 5/2000 | Dodge et al. | 16/2.1 |
| 6,280,132 B1 * | 8/2001 | Szczukowski et al. | 411/353 |
| 6,575,858 B2 * | 6/2003 | Green et al. | 474/133 |
| 6,623,226 B2 * | 9/2003 | Braun et al. | 411/353 |
| 6,659,702 B2 * | 12/2003 | Kitayama et al. | 411/546 |
| 2003/0109342 A1 * | 6/2003 | Oliver et al. | 474/134 |
| 2003/0216203 A1 * | 11/2003 | Oliver et al. | 474/134 |

* cited by examiner

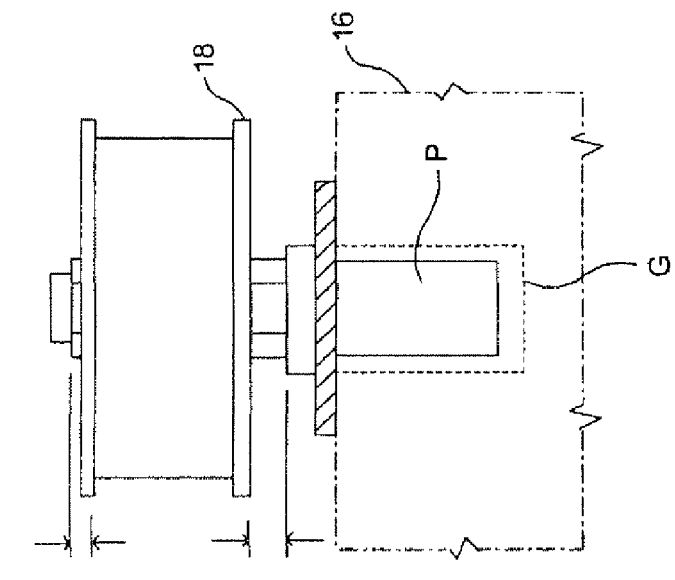
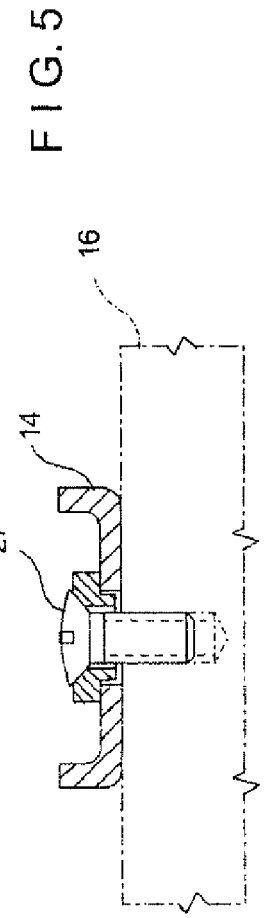
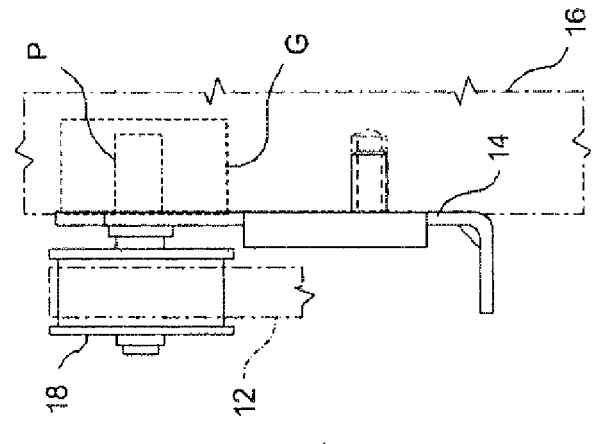
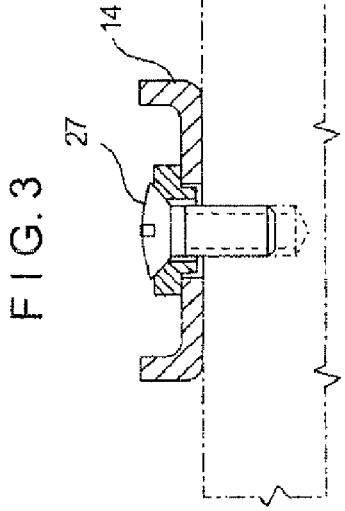
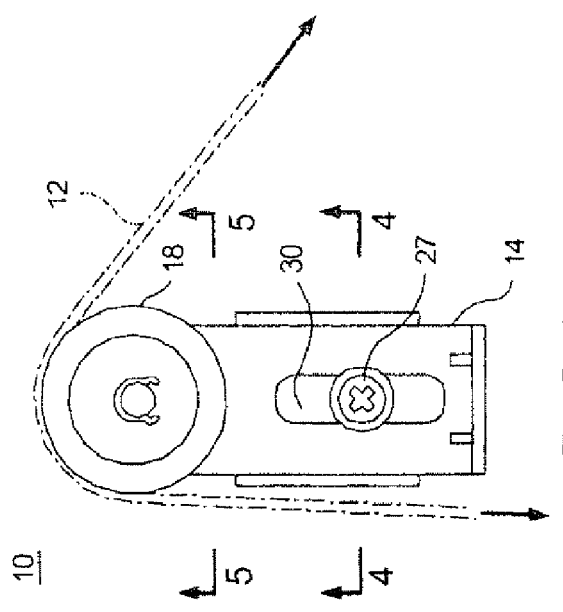
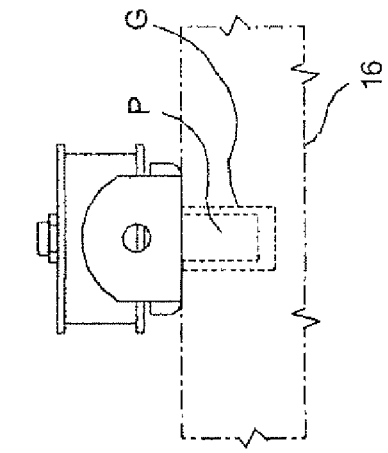

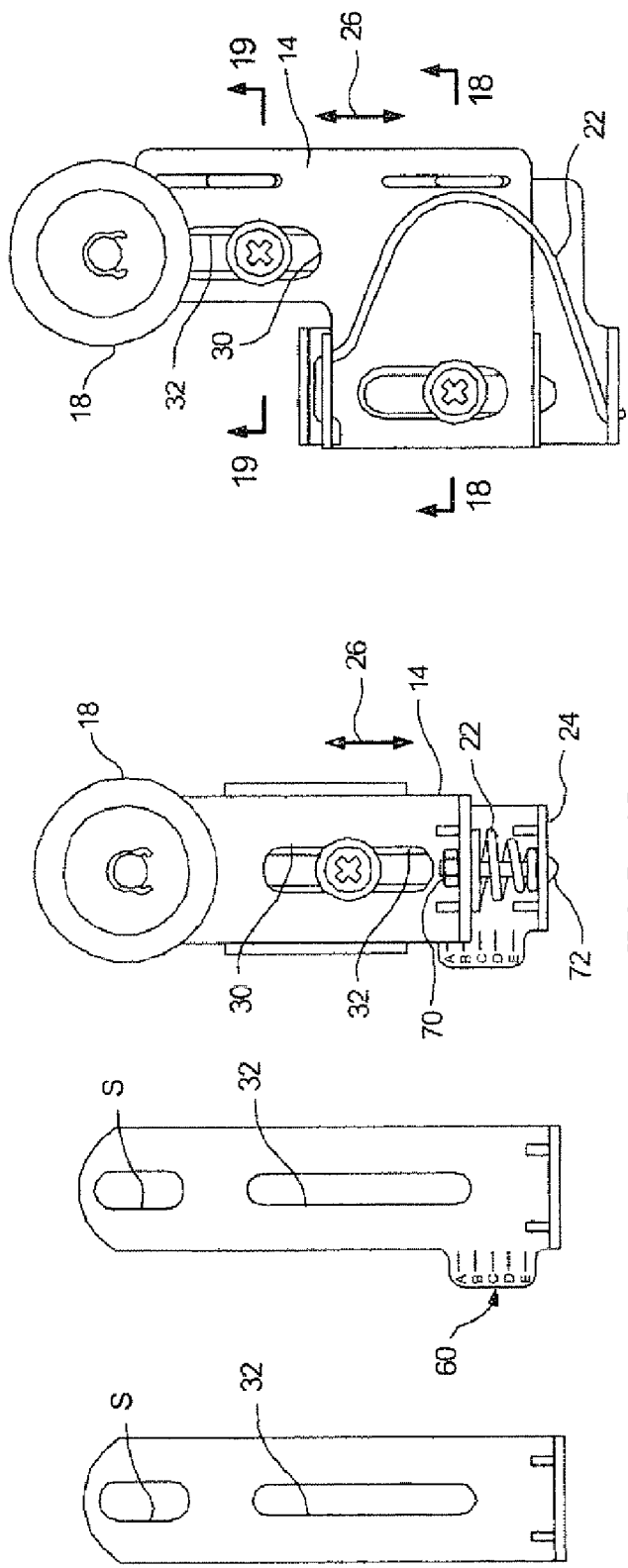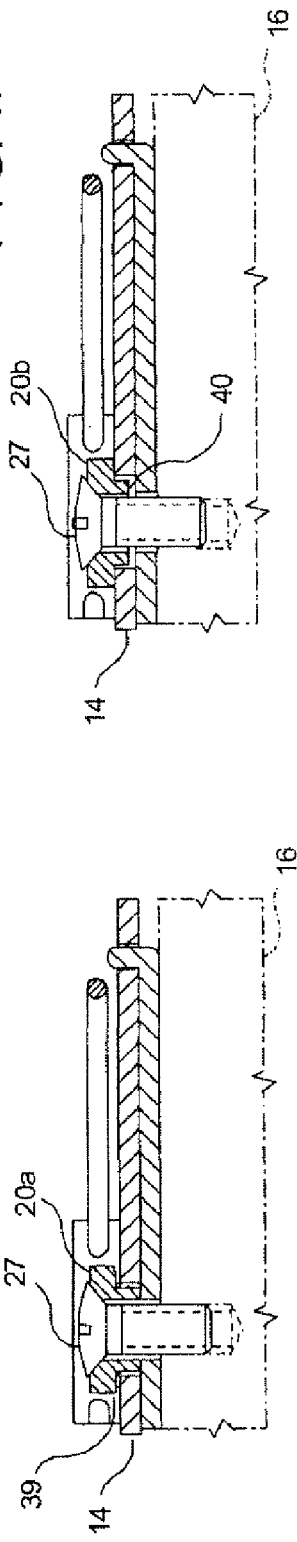

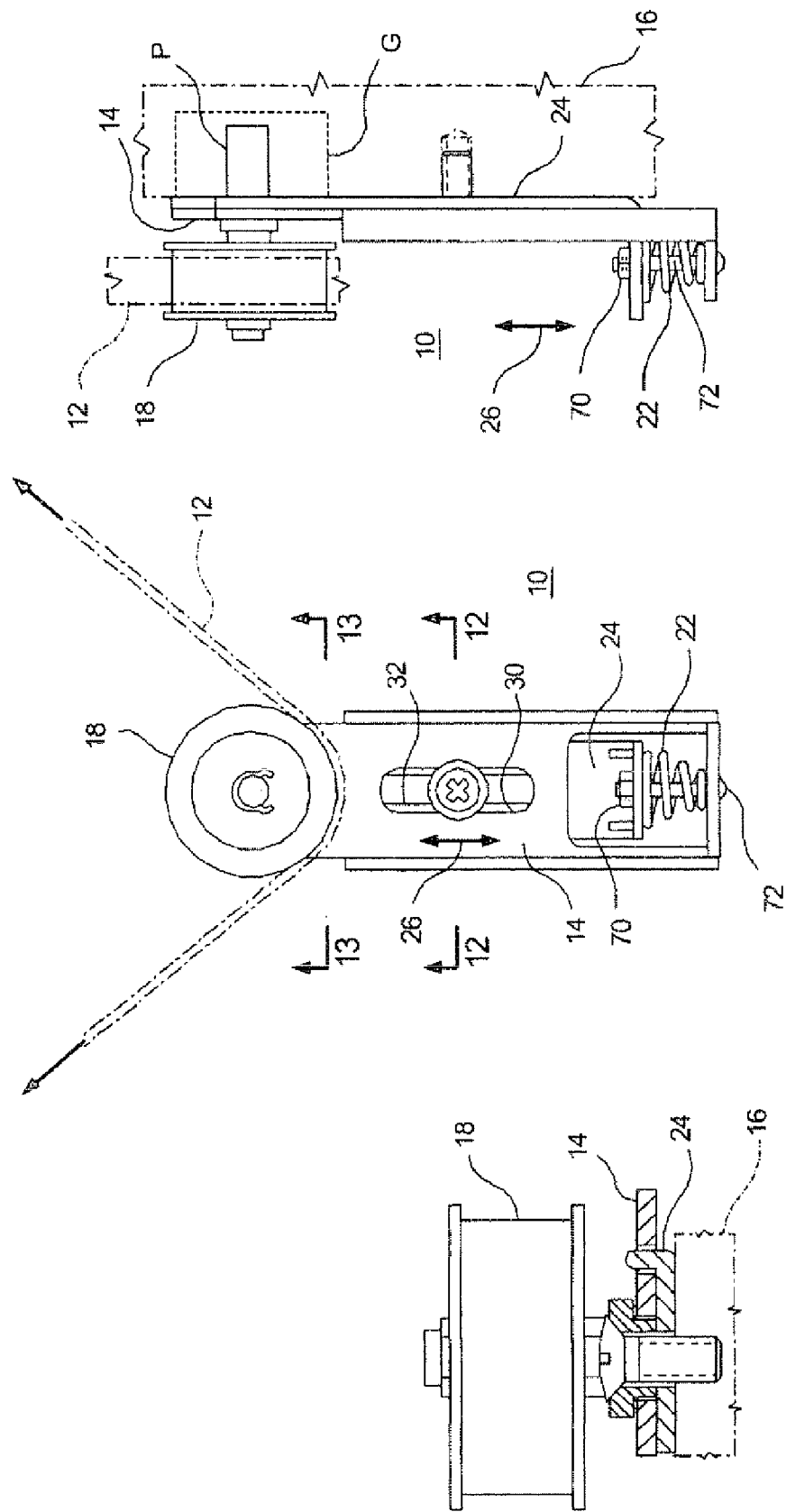

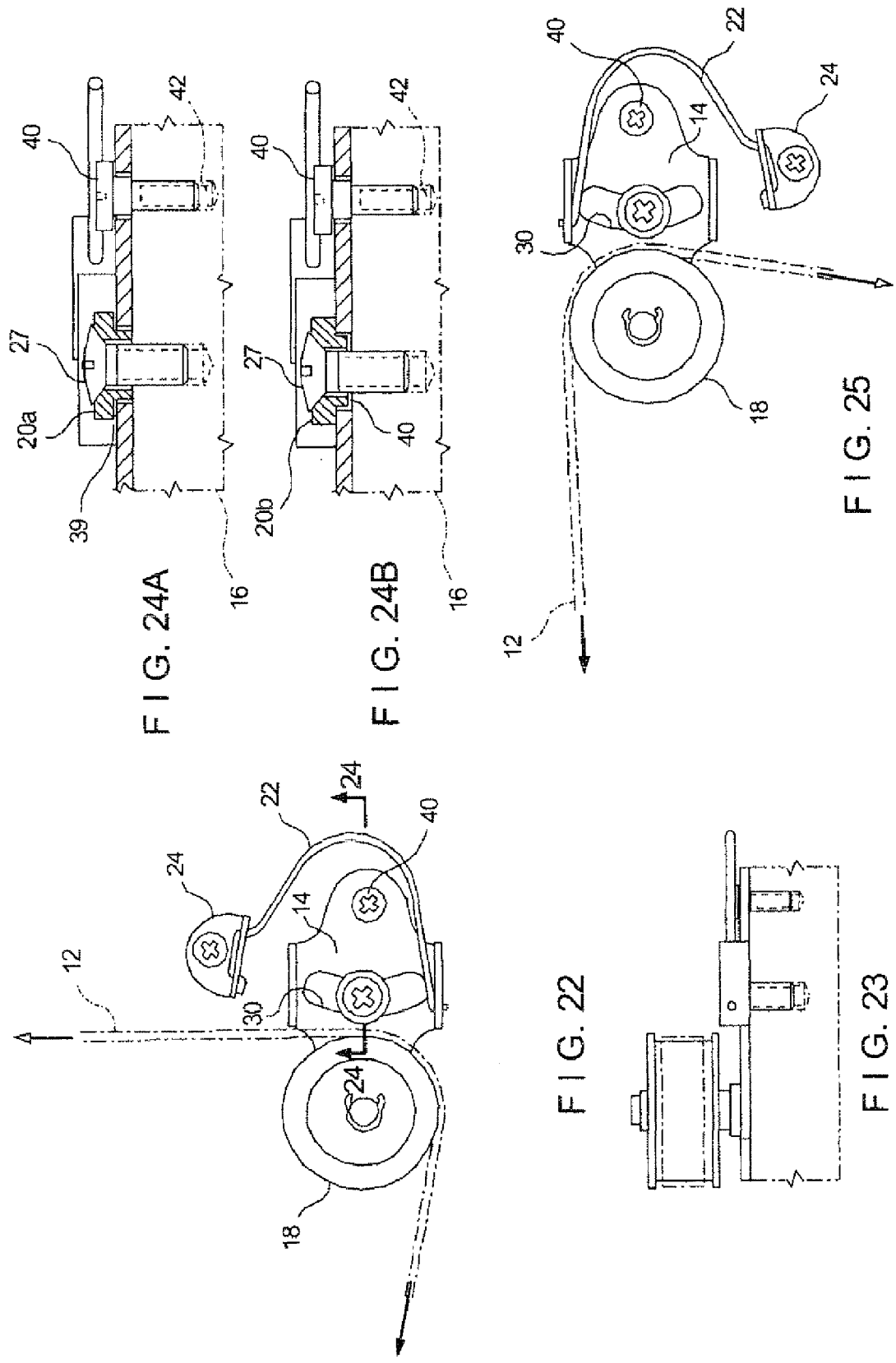

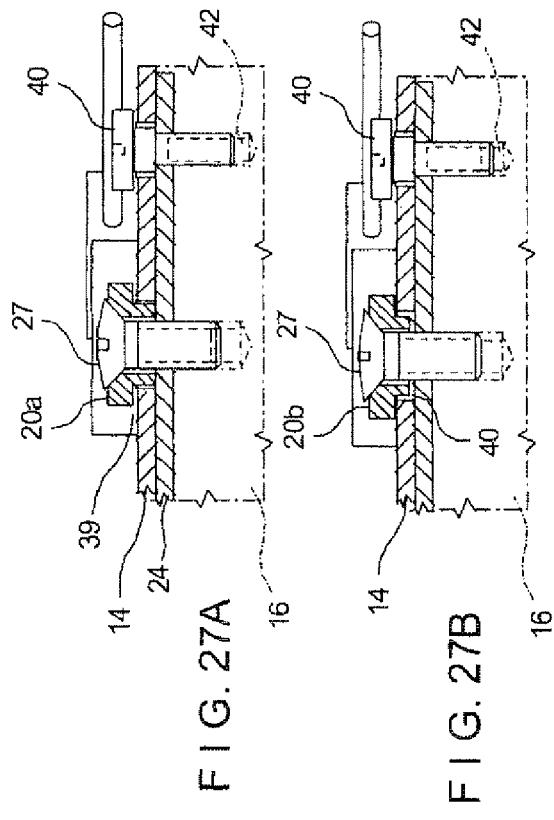
FIG. 27A
FIG. 27B
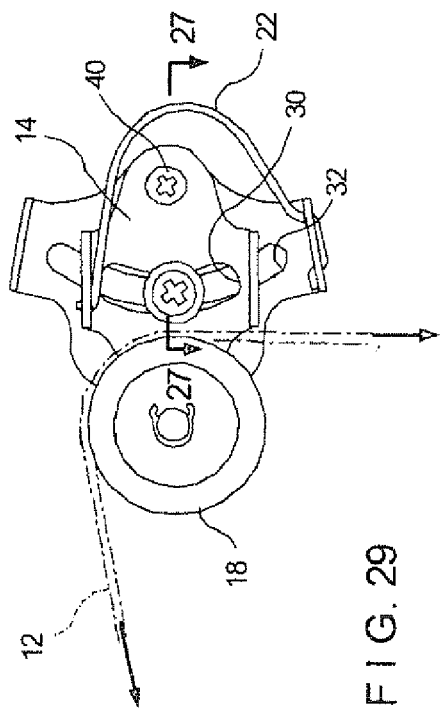
FIG. 29
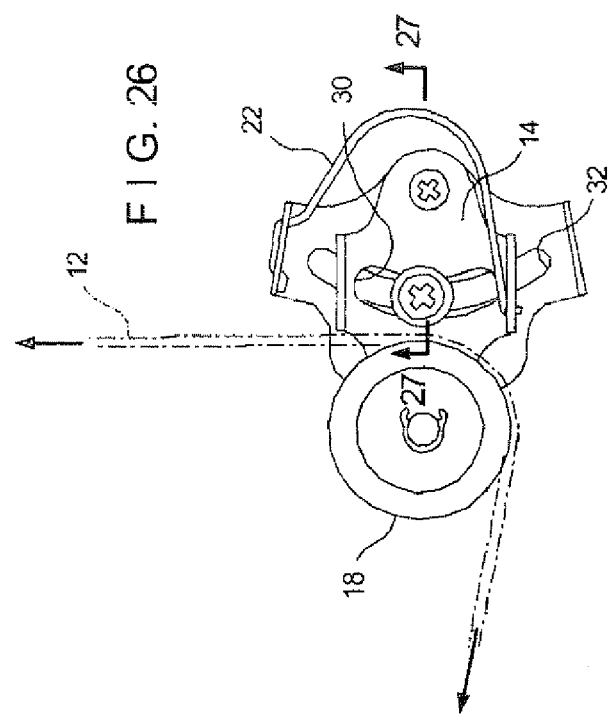
FIG. 26
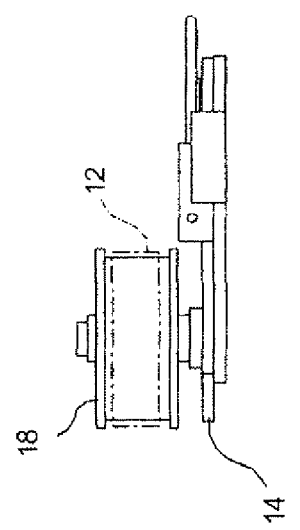
FIG. 28

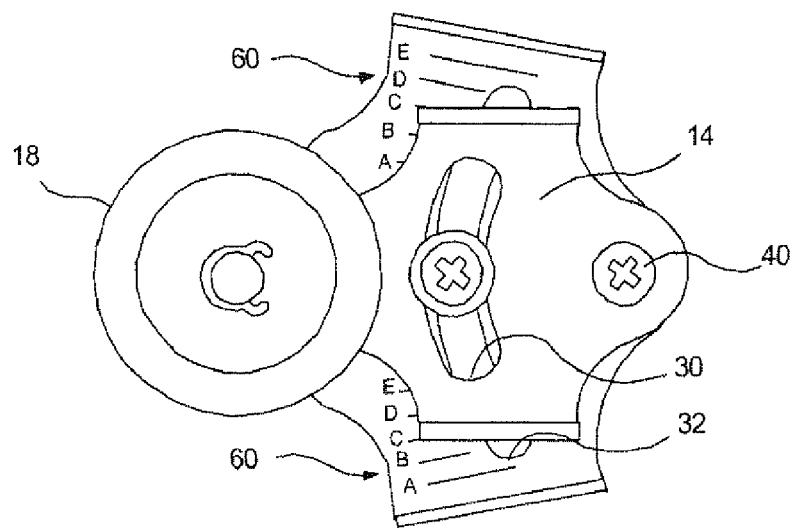
F I G. 30
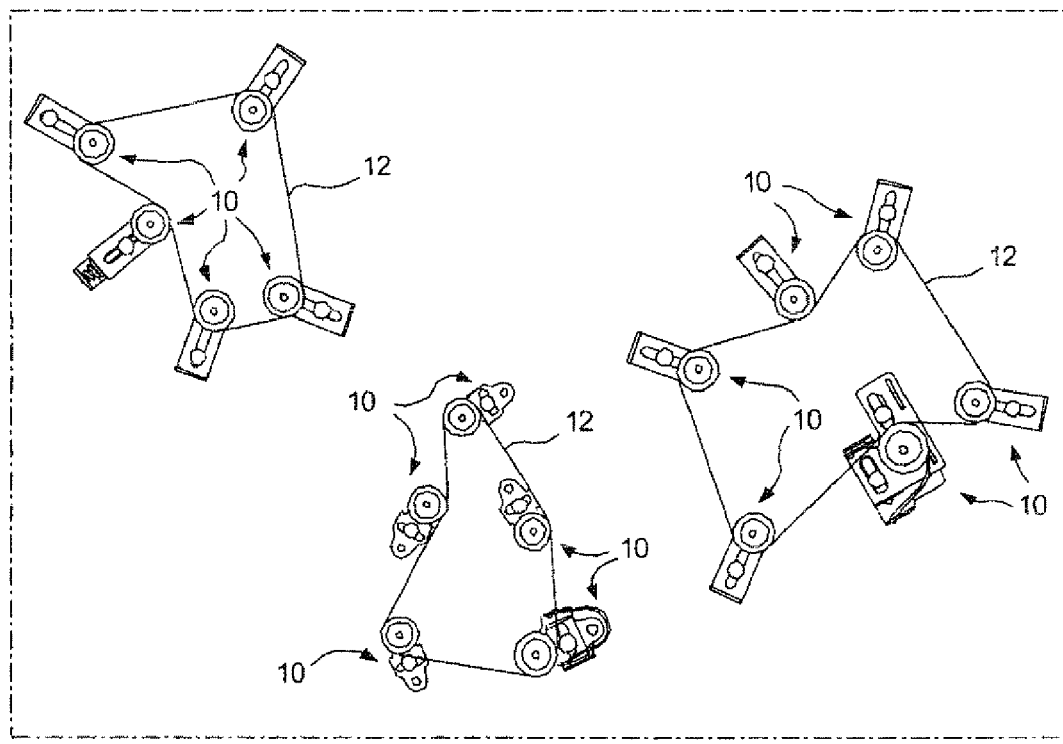
F I G. 31

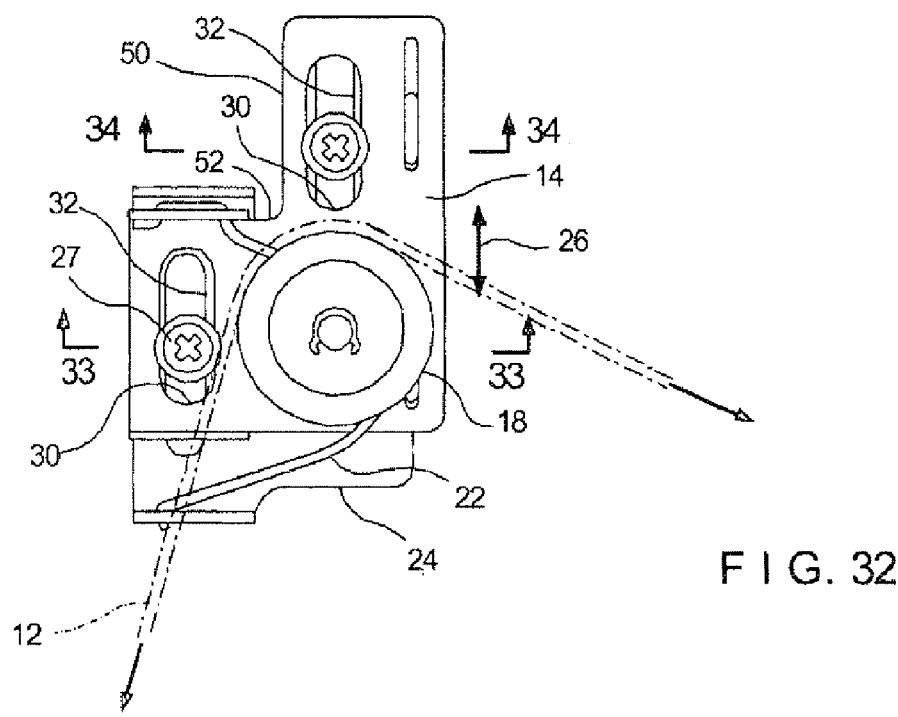
F I G. 32
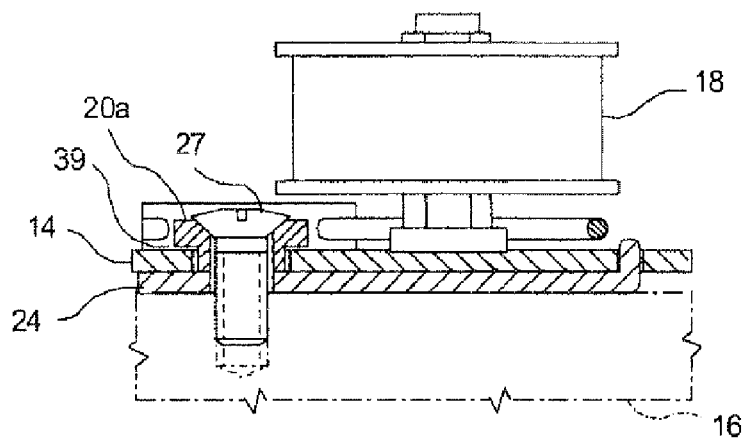
F I G. 33
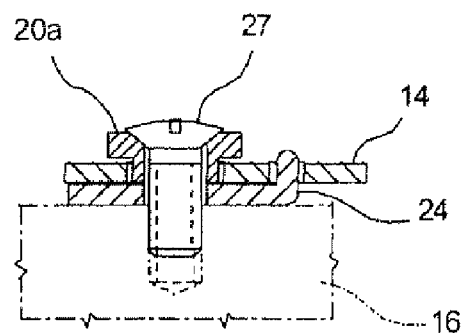
F I G. 34

DEVICE FOR PLACING LOOPED BELT UNDER TENSION

RELATED APPLICATIONS

This application is a continuation of U.S. application Ser. No. 11/093,220 filed Mar. 28, 2005, the entirety of which is incorporated herein by reference.

BACKGROUND OF THE INVENTION

1. Field of the Invention

This invention relates to devices for placing a looped belt under tension and more particularly to such a device that is inexpensive and can be employed in multiple instances to apply proper tension to all of the belts of a complex machine such as a photocopier or medical apparatus. The invention relates also to a method of driving a looped belt in a mode of tensioning that is selectively static or dynamic.

2. Description of the Prior Art

Many complex machines such as photocopiers and sophisticated medical apparatus employ one or more belt drives for turning pulleys and the axles on which they are mounted. The circular movements of the pulleys and axles are converted as may be required into rectilinear and other types of movement, which may be continuous or intermittent.

The belts must all be placed under proper tension in order to work properly. If a belt is too tight it tends to cock pulleys around which it is trained relative to the axles that respectively support the pulleys and to bend the axles. If a belt is too loose it slips on the pulleys and does not turn them reliably, so that the apparatus malfunctions.

Belts tend to stretch during use, so that a belt that is under proper tension when installed may later be too loose; and during operation of a machine, vibrations are often set up that change the tension on a belt many times a second.

If a belt is trained around pulleys that rotate about respective axes that are all fixed (static mode of operation), stretching can be compensated for by stopping the machine periodically and repositioning the pulleys to take up the slack. But this entails machine downtime and is expensive in terms of labor and lost output. Vibrations must simply be accepted in the static mode of operation.

If a belt is trained around pulleys at least one of which rotates about an axis that can be translated in a direction having a component normal to the axis (dynamic mode of operation), belt stretch can be compensated for automatically by a spring that gradually displaces the pulley's axis of rotation to take up the slack that would otherwise develop. The same spring can absorb the vibrations, thereby keeping the tension on the belt substantially constant. This type of mount is likely to be costlier than a static mount.

While pulley mounts are not individually expensive, their total cost in a complex machine is not inconsiderable. Typically each mount is individually designed in view of available anchor points, etc., in a machine. This entails the cost of design and engineering to determine the best mount design at each location in a machine, the cost of manufacturing to the several design specifications, and the cost of familiarizing service personnel with the several designs.

All of the problems described above are compounded by the many different designs of machines that have belt drives. Each model of each kind of machine requires a separate solution to the problem of mounting each belt. These costs contribute considerably to the total cost of the machines.

OBJECTS AND SUMMARY OF THE INVENTION

An object of the invention is to remedy the problems of the prior art noted above. In particular, an object of the invention is to provide a device for placing a looped belt under tension, the device being designed so that it is inexpensive and can be employed in multiple instances to apply proper tension to all of the belts of a complex machine such as a photocopier or medical apparatus. A further object of the invention is to provide a single device that is versatile enough to enable either a static or a dynamic mounting for a belt and that can be mounted at virtually any location on a machine, thereby easing constraints and improving flexibility in designing a machine.

These and other objects are attained by providing a device for placing a belt under tension, the device comprising a tension arm for mounting on a base and a pulley mounted on the tension arm for engaging the belt. In accordance with the invention, means is provided for selecting a static mode wherein the tension arm is held stationary relative to the base, or a dynamic mode wherein, in response to a changing force applied between the pulley and the belt, the tension arm moves relative to the base in such a manner as to maintain the force substantially constant.

From another standpoint, the stated objects and others are attained by mounting a tension arm on a base and mounting a pulley on the tension arm for engaging the belt. In accordance with the invention, one selects a static mode by holding the tension arm stationary relative to the base, or a dynamic mode by enabling the tension arm to move in response to a changing force applied between the pulley and the belt in such a manner as to maintain the force substantially constant.

BRIEF DESCRIPTION OF THE DRAWINGS

A better understanding of the objects, features and advantages of the invention can be gained from a consideration of the following detailed description of its preferred embodiments, in conjunction with the appended figures of the drawing, wherein:

FIG. 1 is a top view of a device constructed in accordance with the invention;

FIGS. 2 and 3 are respectively front and side views of the device;

FIGS. 4 and 5 are respectively views taken along the lines 4-4 and 5-5 of FIG. 1 and looking in the direction of the arrows;

FIG. 14 is a top view of a spring bracket constructed in accordance with the invention;

FIG. 15 is a top view of a modified form of spring bracket;

FIG. 16 is a top view of a spring bracket and tension arm constructed in accordance with the invention and adapted for rectilinear displacement of a pulley;

FIG. 17 is a view corresponding to FIG. 16 and showing another embodiment of the invention;

FIGS. 18A and 18B views are taken along the line 18-18 of FIG. 17, looking in the direction of the arrows, and respectively showing different modes of operation of the device;

FIG. 19 is a view taken along the line 19-19 of FIG. 17, looking in the direction of the arrows, and showing insertion of a mounting bushing adapted for dynamic operation of the device;

FIGS. 20 and 21 are top and side views, respectively, of an embodiment of a device according to the invention;

FIGS. 22 and 23 are respectively top and side views of another embodiment of a device according to the invention;

FIGS. 24A and 24B are views taken along the line 24-24 of FIG. 22, looking in the direction of the arrows, and respectively showing different modes of operation of the device;

FIGS. 25 and 26 are top views of embodiments of the invention;

FIGS. 27A and 27B are views taken along the line 27-27 of FIG. 26, looking in the direction of the arrows, and respectively showing different modes of operation of the device;

FIG. 28 is a side view of the apparatus of FIG. 26;

FIGS. 29, 30 and 32 are top views of other embodiments of the invention;

FIG. 31 is a schematic representation showing a plurality of devices according to the invention for placing a plurality of belts of a complex machine such as a blood monitor or photocopier under tension, and FIGS. 33 and 34 are respectively views taken along the lines 33-33 and 34-34 of FIG. 32 and looking in the direction of the arrows.

DESCRIPTION OF THE PREFERRED EMBODIMENTS

Figure 6:
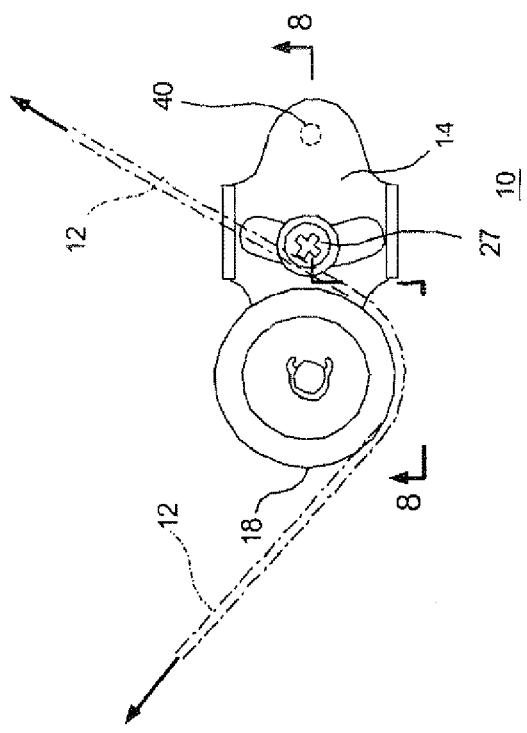
FIG. 6 is a top view of another embodiment of the device.
Figure 7:
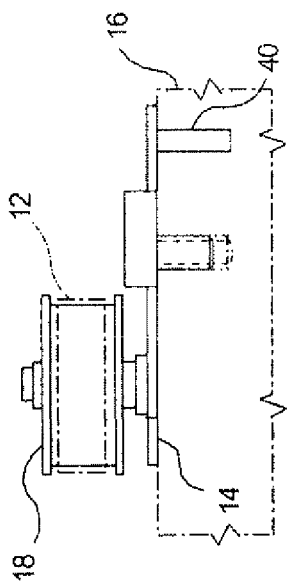
FIG. 7 is a side view of the device of FIG. 6.

FIGS. 1, 3, 6-9, 11, 20-23, 25, 26, 28, 29, 31 and 32 are views, in same cases fragmentary, of several embodiments of a device 10 and a looped belt 12 that the device 10 places under tension. The belt 12 and the pulley 18 are illustrated as smooth, but a belt and pulley with teeth can be used, as those skilled in the art will understand. The other figures omit the belt 12 but show various features of the several embodiments. The device 10 comprises a tension arm 14 for mounting on a base 16, either directly, as in FIG. 4, or indirectly via a spring bracket, as described below. A pulley 18 is mounted on the tension arm 14 for engaging the belt 12. A mounting bushing 20a or 20b (FIG. 12A and FIG. 12B, respectively; see also FIGS. 18A and 18B; 24A and 24B; and 27A and 27B) provides for a dynamic mode of operation (FIGS. 12A, 18A, 24A and 27A) or a static mode of operation (FIGS. 12B, 18B, 24B and 27B), as explained below.

The belt 12 forms a loop, and biasing means such as a compression coil spring 22 has opposite ends that bear respectively against the tension arm 14 and a spring bracket 24. As explained below, a curvilinear or bow spring can also be employed as a biasing means.

Because of vibrations that arise when the machine on which the device 10 is mounted is in operation, the force exerted by the belt 12 on the pulley 18 tends to change rapidly about a mean. Also the belt stretches slowly during an extended period of use. The spring 22 compensates for changes in force due to the vibrations and stretching so as to maintain the force acting between the belt 12 and the pulley 18 substantially constant. The force of the belt 12 on the pulley 18 has a component that acts in a first direction on the pulley 18 and tension arm 14, and the spring 22 or other biasing device applies a force that has a component that acts in a second direction on the pulley 18 and tension arm 14. These two forces are equal and opposite, as indicated by the double-headed arrow 26 in FIGS. 9, 9A, 11, 11A, 16, 17, 20, 21 and 32.

A screw 27 passes through an aperture 28 in the bushing 20a or 20b, through slots 30 and 32 formed respectively in the tension arm 14 and spring bracket 24, and into a threaded blind hole 34 in the base 16. The bushing 20a is used to establish the dynamic mode of operation of the device 20. To establish the static mode, the bushing 20a is removed and the bushing 20b is inserted instead. Since the hole 34 is threaded, the screw 27 can clamp the bushing 20a or 20b, in such a manner as also to clamp the tension arm 14 as in FIG. 12B or leave the tension arm 14 unclamped as in FIG. 12A. The bushing 20a has a portion 36 of reduced outer diameter that is long enough to engage the spring bracket 24 and leave a gap 39 between the bushing 20a and the tension arm 14. This prevents the screw 27 from clamping the flange 38 of the bushing 20a onto the tension arm 14. The tension arm 14 is therefore free to move under the urging of the belt 12 and the spring 22. Thus the screw and bushings 20a, 20b comprise means for selecting the static or dynamic mode.

Figure 12B:
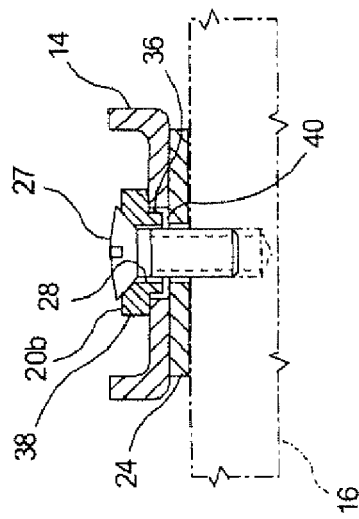
FIGS. 12A and 12B are views taken along the line 12-12 of FIG. 9, looking in the direction of the arrows, and showing different modes of operation of the device.
Figure 10:
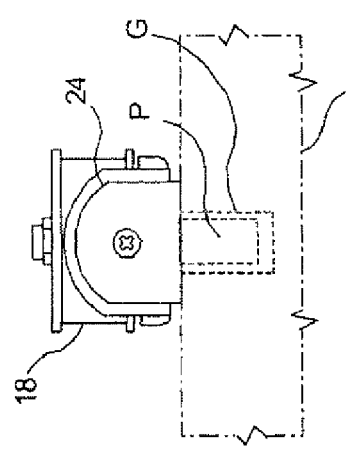

In FIG. 12B, the portion 36 of the bushing 20b is short enough to leave a gap 40a between the bushing 20b and the spring bracket 24. Accordingly, when the screw 27 is tightened, the flange 38 engages the tension arm 14 and clamps it securely.

Figure 12A:
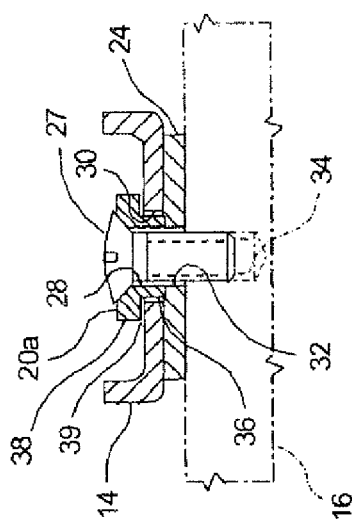

It is thus evident that FIG. 12A establishes the dynamic mode of operation, wherein the tension arm 14 is free to move in response to belt vibrations and stretch and the urging of the spring 22, whereas the bushing 20b in FIG. 12B establishes the static mode of operation, wherein the tension arm 14 is immobilized.

The preceding discussion of FIGS. 12A and 12B applies also to FIGS. 18A and 18B; 24A and 24B; and 27A and 27B.

For convenience, an extra blind hole can be provided in the base 16, whereby a screw 27 can secure whichever bushing 20a or 20b is not currently being used to establish the selected mode of operation of the device. This prevents loss of whichever bushing is not currently in use and makes it easy to change bushings when necessary.

In FIG. 31, a plurality of looped belts 12 have tension applied to them by essentially the same devices 10 constructed in accordance with the invention. FIG. 31 shows one device 10 for each belt 12 operating in a dynamic mode and the others operating in a static mode. But that is merely for purposes of illustration. It is within the scope of the invention to deploy devices 10 for any or all of the belts 12 solely in the static mode, solely in the dynamic mode, or in any mixture of static and dynamic modes, as may be required.

Different devices 10 constructed in accordance with the invention and establishing in the dynamic mode a rectilinear movement, an arcuate movement, etc., of a pulley axle may be employed, as explained below.

As FIGS. 1, 9, 14-17, 20 and 32 show, the slots 30 and 32 formed respectively in the tension are 14 and spring bracket 34 can be straight, thereby enabling rectilinear movement of the pulley 18. A guide post P extends through a slot S in the spring bracket 24 and into a groove G in the base 16 to guide the rectilinear movement of the pulley 18 (the tolerance between the post P and the groove G is not drawn to scale). As FIGS. 6, 22, 25, 26, 29 and 30 show, the slots can alternatively be made arcuate and the tension arm 14 and spring bracket 24 can be pivoted about a pivot post or screw 40. A pivot screw when tightened in a blind threaded hole 42 (see for example FIGS. 27A and 27B) clamps the spring bracket 24 but not the tension arm 14. The latter is therefore free to pivot or not, depending on whether one employs a bushing 20a as in FIG. 27A, or a bushing 20b as in FIG. 27B. A fixed pivot post (see, e.g., FIG. 8) is preferred to a screw, since a post reduces the number of separate parts and the cost of assembly.

Whether the motion is rectilinear or arcuate, the spring 22 may be a compression coil spring 22 as described above or a curvilinear or bow spring 22a as illustrated in FIGS. 17, 22, 25, 26, 29 and 32. In either case, one end of the spring bears against the tension arm 14 and the other against the spring bracket 24 (or directly against the base 16). The spring bracket 24 is secured to the base 16, so that the spring, whether a compression coil spring 22, a bow spring 22a, another type of spring, or indeed any generic biasing device, helps to control the movement of the axle on which the pulley 18 is mounted when the device 10 is operating in the dynamic mode.

A compression coil spring is well adapted for linear movement of the pulley axle and a bow spring is well adapted for arcuate movement of the pulley axle, but any suitable biasing means may be used to assist in controlling either type of movement. For example, FIG. 29 shows a bow spring adapted to assist in controlling arcuate movement of the axle of the pulley 18, and FIG. 32 shows a bow spring adapted to assist in controlling rectilinear movement of the axle.

FIGS. 17 and 32 differ in the mounting of the pulley 18. The structure shown in FIG. 17 is less advantageous from an engineering standpoint than that shown in FIG. 32 but is another example of the wide variety of ways of embodying the invention. In FIG. 32, the pulley 18 is mounted at the juncture of fingers 50 and 52 of the tension arm 14, and the spring 22a runs under the pulley 18, making a compact design. This mounting better enables the device 10 to withstand the tension exerted by the belt 12 on the pulley 18 with little or no tendency for the tension arm 14 to be deformed even in the case of a high belt tension.

Figure 13:
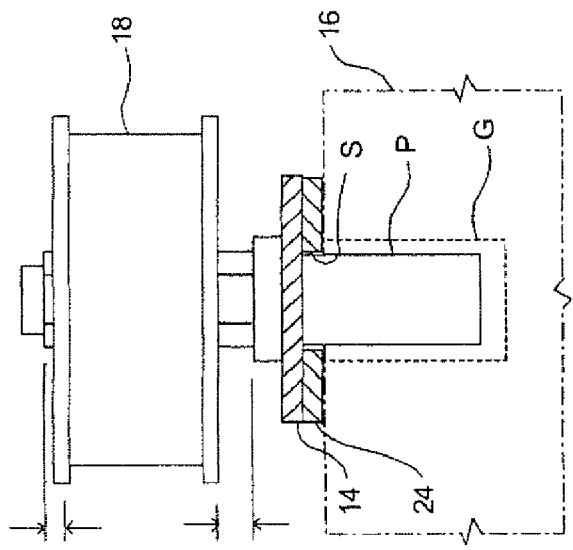
FIG. 13 is a view taken along the line 13-13 of FIG. 9 and looking in the direction of the arrows.

Adjusting means such as any suitable shim, clip or threaded device can be used to adjust the height of the pulley 18 above the base 16, or the thickness of the tension arm or spring bracket can be such as to position the pulley at a desired height above the base, as in FIGS. 5 and 13.

Figure 8:
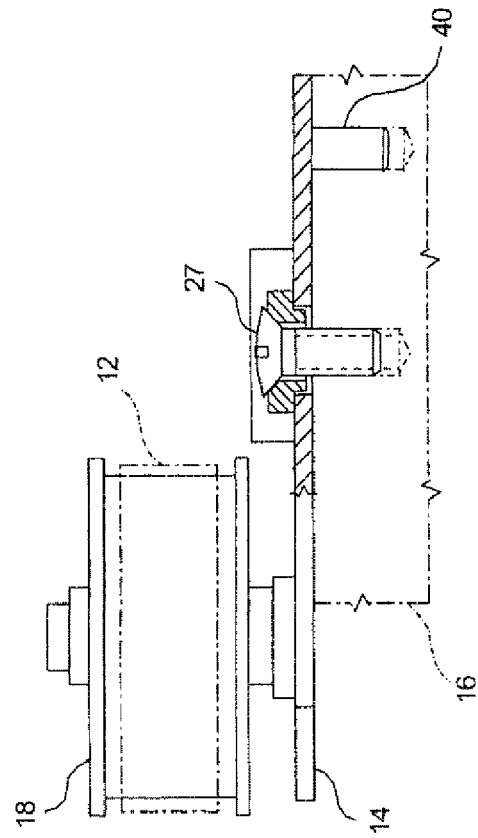
FIG. 8 is a view taken along the broken line 8-8 of FIG. 6 and looking in the direction of the arrows.

In a case where only the static mode is to be employed, the spring bracket can be eliminated, and the tension arm 14 can be clamped directly to the base 16, as in FIGS. 4 and 8.

The spring bracket can be "plain" as in FIG. 14 or provided with indicia 60 as in FIG. 15 for easy set-up of the device with proper tension. FIG. 30 shows two sets of set-up indicia applied to a device wherein the movement of the axle of the pulley 18 is arcuate. In FIG. 30, both the lower and upper sets of indicia are labeled A through E. The spring bracket 14 nearly covers the scribe marks labeled D and E of the lower set of indicia and those labeled A and B of the upper set, and the lower and upper edges of the spring bracket register with the scribe mark labeled C in each set. As the spring bracket 14 pivots about pivot 40, the lower and upper edges of the spring bracket 14 are always positioned identically with respect to the lower and upper sets of indicia respectively. The spring bracket 14 can therefore easily be set to an "A" position, a "B" position, a "C" position (as illustrated), etc.

Figure 9:
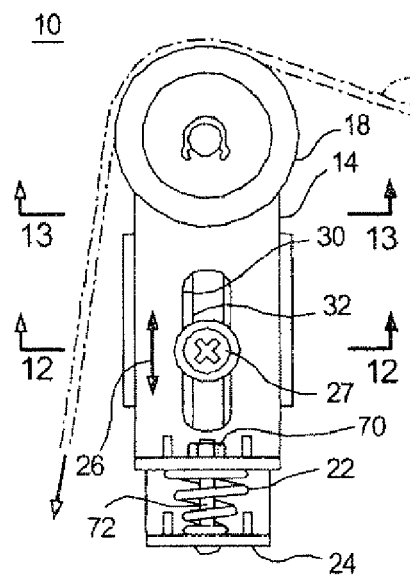
FIGS. 9-11 are respectively top, front and side views of another embodiment of the device.
Figure 11:
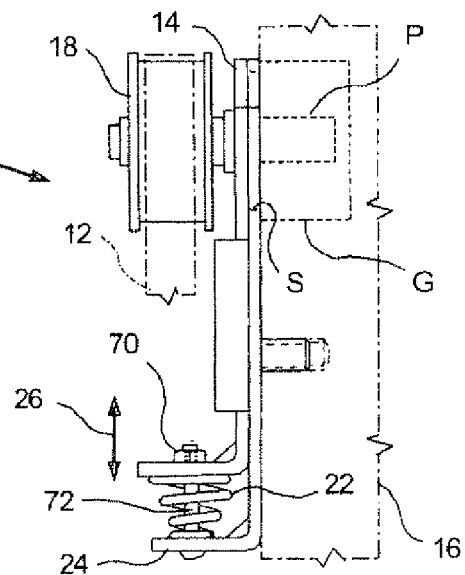
Figure 9A:
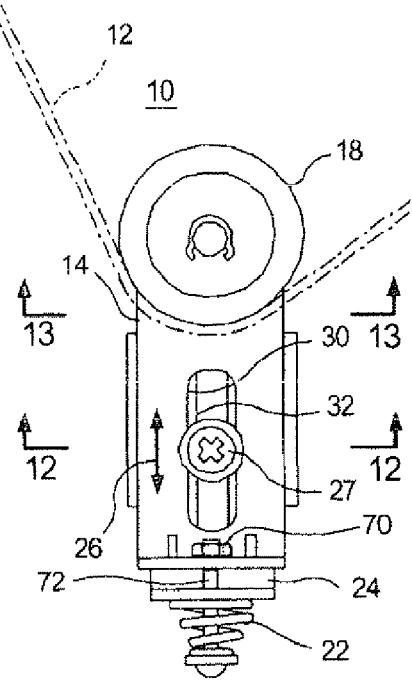
FIGS. 9A and 11A are respectively top and side views of the embodiment of FIGS. 9-11 set up in a different configuration.
Figure 11A:
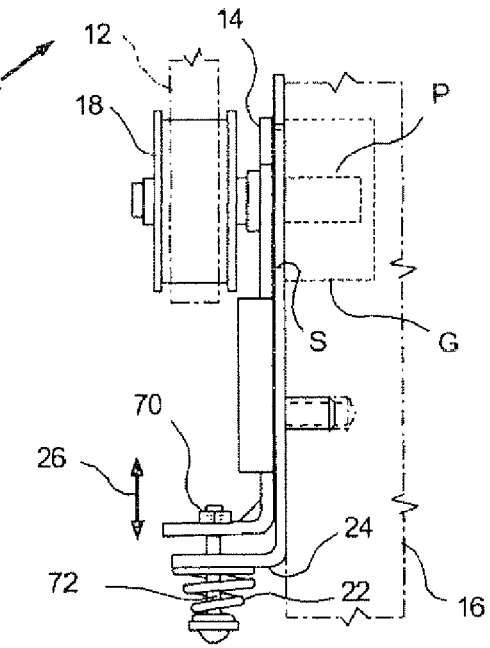

By reversal of the direction in which the biasing means 22 urges the tension arm, the device 10 can accommodate the case where the belt 12 runs around either side of the pulley 18. Compare, for example, FIGS. 9 and 11 with FIGS. 9A and 11A, FIG. 22 with FIG. 25; or FIG. 26 with FIG. 29. In FIGS. 9 and 11, the compression coil spring 22 urges the tension arm "upward" (i.e., towards the top of the figure) and in FIGS. 9A and 11A, the spring 22 urges the tension arm 14 "downward" (i.e., toward the bottom of the figure). Similarly, the bow spring 22a urges the tension arm 14 counterclockwise about the pivot post or screw 40 in FIG. 22 and clockwise in FIG. 25.

The reversal of the direction in which the spring acts requires only a remounting of the spring 22. If a bow spring is employed, it is mounted so that its "upper" end engages the spring bracket and its "lower" end engages the tension arm, as in say, FIG. 26, or so that the upper end engages the tension arm and the lower end engages the spring bracket, as in, say, FIG. 29. If a compression coil spring is employed, a nut 70 (FIGS. 9, 9A, 11, 11A, 16, 20 and 21) is removed, a pin 72 withdrawn, the spring 22 positioned on the side of the spring bracket 24 opposite the pulley 18, the pin 72 inserted through the spring 22 and the apertures in the spring bracket and tension arm, and the nut 70 reattached to the pin 72. Instead of using the nut 70, one can simply thread the pin through the tension arm 14, thereby eliminating a part.

Note also the low profile arrangement as apparent in, for example, FIGS. 26-28 where it can be seen that the tension arm extends in one plane and the pulley 18, which rotates about an axis substantially perpendicular to the plane of the extension arm, allows the belt 12 to extend in a plane substantially parallel to the plane of the tension arm. because the pulley 18 extends above the tension arm and any structure by which the tension arm is secured to the base), the belt may engage the pulley from any angle within the plane in which the belt extends, without interference.

Thus there is provided in accordance with the invention a novel and highly effective device for placing a looped belt under tension. The device is inexpensive and can be employed in multiple instances to apply proper tension to all of the belts of a complex machine such as a photocopier or medical apparatus. The invention provides also a method of driving a looped belt in a mode of tensioning that is selectively static or dynamic. The preferred embodiments of the invention are disclosed herein, but they are merely illustrative of ways of putting the invention into practice. The invention extends to all embodiments thereof that are encompassed by the appended claims.

The invention claimed is:

1. A device for placing a looped belt under tension, the device comprising:
 a tension arm moveably mounted on a base, said tension arm lying substantially in a first plane;
 a pulley mounted on said tension arm for rotation about an axis substantially perpendicular to said first plane, said pulley adapted to be engaged by the looped belt;
 wherein said tension arm is formed with a slot and said base is formed with a threaded hole;
 a screw passing through said slot and into said threaded hole and formed with a screw head; and
 first and second interchangeable bushings having different axial lengths, either of which can be interposed between said screw head and said tension arm such that said screw passes through a selected one of said first and second bushings and into said base, wherein, upon tightening said screw, said first bushing enables said screw head to clamp said tension arm to said base, thereby establishing a static mode wherein said tension arm is held stationary relative to said base, and said second mounting bushing prevents said screw head from clamping said tension arm to said base, thereby establishing a dynamic mode wherein, in response to a changing force applied between said pulley and the looped belt, said tension arm moves relative to said base in such a manner as to maintain the force substantially constant.

2. The device according to claim 1 wherein each of said first and second bushings has first and second portions, the first portion adjacent to said screw head and having a diameter too large to pass through said slot, and the second portion extending from the screw head and having a diameter small enough to pass through the slot and said tension arm toward said base; wherein said second portion of the first bushing has an axial length dimension short enough to enable said screw head to clamp said tension arm to said base, and wherein said second portion of the second bushing has an axial length dimension long enough to prevent the screw head from clamping said tension arm to said base.

3. The device according to claim 2 and further comprising a spring bracket mounted on said base and a spring engaged between the spring bracket and said tension arm, wherein said spring bracket is formed with a slot that overlaps and is narrower than the slot in said tension arm, whereby the first mounting bushing enables immobilization of both the tension arm and the spring bracket and the second mounting bushing enables immobilization of the spring bracket but prevents immobilization of the tension arm.

4. The device according to claim 1 comprising reference indicia on said tension arm facilitating adjustment of said pulley against the looped belt.

5. The device according to claim 1 wherein the force includes a component that acts in a first direction on said pulley and said tension arm, further comprising biasing means that applies a second force that has a component that acts in a second direction on said pulley and on said tension arm, the first and second directions being opposite each other.

6. The device according to claim 5 wherein the biasing means comprises a spring bracket mounted on the base and a spring engaged between said spring bracket and said tension arm.

7. The device according to claim 6 wherein said spring can be mounted to urge said tension arm in any of a plurality of first directions in order to place the looped belt under tension when run around said pulley in such a way as to tend to translate said pulley in any of a plurality of second directions opposite the first directions.

8. A device for placing a belt under tension, the device comprising:
    a tension arm movably mounted on a base for rotation about a first axis;
    a pulley mounted on the tension arm for rotation about a second axis extending substantially parallel to said first axis and substantially perpendicular to said tension arm and adapted to be engaged by the belt;
    a fastener extending through an arcuate slot in said tension arm and into said base; and
    plural selectively interchangeable bushings of different axial lengths, one of which is adapted to be interposed between said fastener and said tension arm so as to enable said fastener to clamp said tension arm to said base; and another of which is adapted to be interposed between said fastener and the tension arm so as to permit rotation of said tension arm relative to said base in response to a changing force applied between said pulley and the looped belt.

9. The device of claim 8 wherein said plural interchangeable bushings comprise a pair of bushings of different axial lengths.

* * * * *